(12) United States Patent
Glenn et al.

(10) Patent No.: US 6,875,379 B2
(45) Date of Patent: Apr. 5, 2005

(54) TOOL AND METHOD FOR FORMING AN INTEGRATED OPTICAL CIRCUIT

(75) Inventors: Thomas P. Glenn, Gilbert, AZ (US); Steven Webster, Manila (PH)

(73) Assignee: Amkor Technology, inc., Chandler, AZ (US)

( * ) Notice: Subject to any disclaimer, the term of this patent is extended or adjusted under 35 U.S.C. 154(b) by 330 days.

(21) Appl. No.: 09/751,537

(22) Filed: Dec. 29, 2000

(65) Prior Publication Data

US 2004/0245659 A1 Dec. 9, 2004

(51) Int. Cl.[7] .............................................. B29D 11/00
(52) U.S. Cl. ................... 264/1.24; 249/114.1; 249/134; 249/135; 264/1.7; 264/2.5; 264/319
(58) Field of Search ................................. 264/1.24, 1.6, 264/2.5, 1.7, 319, 322; 435/385, 810; 249/114.1, 134, 135

(56) References Cited

U.S. PATENT DOCUMENTS

| | | | | |
|---|---|---|---|---|
| 3,767,445 | A | * 10/1973 | Chandross et al. | |
| 5,369,722 | A | * 11/1994 | Heming et al. | |
| 5,637,264 | A | * 6/1997 | Knapp et al. | 264/1.24 |
| 6,314,228 | B1 | * 11/2001 | Korenaga et al. | |

OTHER PUBLICATIONS

Whitesides, George M., et al., *Replica molding: Complex optics at lower costs*, Jan. 1997, pp. 90–91.
Wu, Linghui, et al., *Compression–Molded Three–Dimensional Tapered Polymeric Waveguides for Low–Loss Optoelectronic Packaging*, Dec. 1997, pp. 1601–1603, IEEE Photonics Technology Letters, vol. 9, No. 12.
Allington–Smith, Jeremy, et al., *Fibers Optics in Astronomy III*, Dec. 2–4, 1997, 2 pages.

* cited by examiner

Primary Examiner—Mathieu D. Vargot
(74) Attorney, Agent, or Firm—Gunnison, McKay & Hodgson, L.L.P.; Serge J. Hodgson

(57) ABSTRACT

Tools and methods for making molded an optical integrated circuit including one or more waveguides are disclosed. In one embodiment, a molding die is provided that includes a substrate that has a topographically patterned first surface. A conformal protective film is provided over the first surface of the substrate. The substrate may be formed of silicon or gallium arsenide, and may be patterned using conventional semiconductor patterning techniques, such as plasma etching. The protective film may be metal (e.g., nickel or titanium), diamond, or some other hard material. Typically, a plurality of such molding dies are formed from a wafer of the substrate material. The die is pressed into a moldable material, such as thermal plastic, to form the wave guide(s) of the optical integrated circuit. A plurality of the dies may be mounted around the curved surface of a heated roller, and a heated tape of the waveguide material may be fed under the roller in a mass production process. Alternatively, the die may be mounted in an injection molding cavity, and the IOC may be formed by an injection molding process.

15 Claims, 6 Drawing Sheets

TOOL AND METHOD FOR FORMING AN INTEGRATED OPTICAL CIRCUIT

BACKGROUND OF THE INVENTION

1. Field of the Invention

The present invention involves integrated optical circuits ("IOC") formed of moldable materials, such as thermal plastic, and tools for making such IOCs.

2. Description of Related Art

An integrated optical circuit (IOC) is a collection of one or more miniature optical waveguides on a substrate that provides optically transmitting paths for connection between optical components. Typically, such optical components include lasers, optical amplifiers, optical modulators, and optical detectors. Usually IOCs are similar in size to electronic integrated circuits, with areas ranging between 1 and 625 square millimeters.

Some IOCs are formed by compression-molding a material that is optically transparent. The molded material may be a polymer, a thermoplastic, or another moldable plastic. As is typical in compression-molding, a molding die is shaped as a "negative copy" of the IOC. The molding die is pressed into the moldable material, and the die forms the moldable material into a "positive copy" of the IOC, a copy identical in shape to the desired waveguide.

Demand for IOCs is increasing due to increased usage of fiber optics and optical chips. Accordingly, methods and tools capable of making IOCs in efficient and cost effective manner are need.

SUMMARY OF THE INVENTION

The present invention provides tools and methods for economically making IOCs including one or more waveguides using conventional moldable materials.

One embodiment of a tool within the present invention includes a molding die. The molding die includes a substrate having a topographically patterned first surface. A conformal protective film is provided over said first surface. The film has an outer second surface that forms a negative copy of the IOC to be molded using the molding die.

In one method of making the molding die, a silicon or gallium arsenide wafer is provided. The wafer may be used to form a plurality of the molding dies simultaneously. The wafer is patterned to form the patterned first surface, which typically includes trenches and/or ridges. The patterning may be done using methods common to semiconductor manufacturing, such as plasma etching through a photoresist mask. The protective film may be any hard, durable material compatible with the material of the substrate. For example, the film may be metal, aluminum oxide, or diamond, among other possibilities. The film may be deposited on the wafer by plating or sputter deposition, among other possibilities. Finally, the wafer is cut into various pieces, with each piece comprising one of the molding dies or a strip of the molding dies. If desired, a backing plate may be attached to the substrate opposite the first surface to lend support to the substrate.

An alternative embodiment of a tool for molding such an IOC includes a roller having the shape of a cylinder with a curved outer surface. One or more of the novel molding dies described above (or one or more conventional molding dies) are applied to the curved outer surface of the roller. The molding dies may be bent so as to conform to the curved outer surface of the roller.

The present invention also includes methods of compression molding one or more IOCs. An exemplary method includes providing a molding die and a moldable first material. The molding die includes a substrate with a topographically patterned first surface, and a hard protective film over the first surface. The exposed outer surface of the film is the molding surface of the molding die. The first material is positioned on a holding substrate. One or both of the molding die and the first material are heated to a selected molding temperature. The molding surface of the molding die is pressed into the first material at a selected pressure, thereby molding a patterned IOC surface in the first material. The first material is then cured.

In one embodiment, a molded IOC surface includes a plurality of channels. The channels are filled with a second moldable material that is optically transmissive, thereby forming a waveguide. The first and second materials are cured simultaneously or in separate steps.

An alternative method within the invention for compression-molding an IOC includes providing a molding tool having one or more molding dies mounted on a roller. A tape of a moldable first material also is provided. The molding tool and/or the tape are heated. The tape is fed under the rolling molding tool, which presses its molding die(s) into the tape of the first material, thereby molding a patterned IOC surface. The tape is then cured, and individual IOCs are singulated from the tape using a saw or some other severing device.

Another method within the present invention for molding an IOC includes providing a mold having a cavity defined by an interior surface. A molding die is mounted on the interior surface of the cavity. The molding die includes a substrate with a topographically patterned first surface, and a hard protective film over the first surface. The exposed outer surface of the film is the molding surface of the molding die. A moldable first material is injected into the cavity so that the first material contacts and conforms to the molding surface of the die, thereby molding a patterned IOC surface. The first material is cured, and removed from the mold.

These and other aspects of the present invention may be better appreciated in view of the attached drawings and the following detailed description.

BRIEF DESCRIPTION OF THE DRAWINGS

FIG. 4b is a cross-sectional side view of molding tool 4 of FIG. 4a.

FIG. 5b is a cross-sectional side view of molding tool 5 of FIG. 5a.

FIG. 6b is a cross-sectional side view of molding die 1 of FIG. 1 being used according to method 50 of FIG. 6a.

FIG. 6c is a cross-sectional side view of an alternative IOC that was molded according to method 50 of FIG. 6a.

FIG. 6d is a cross-sectional side view of a further alternative IOC that was molded according to method 50 of FIG. 6a.

In the drawings, where the different embodiments have similar structures, the same reference numbers are usually used.

DETAILED DESCRIPTION

Figure 1:
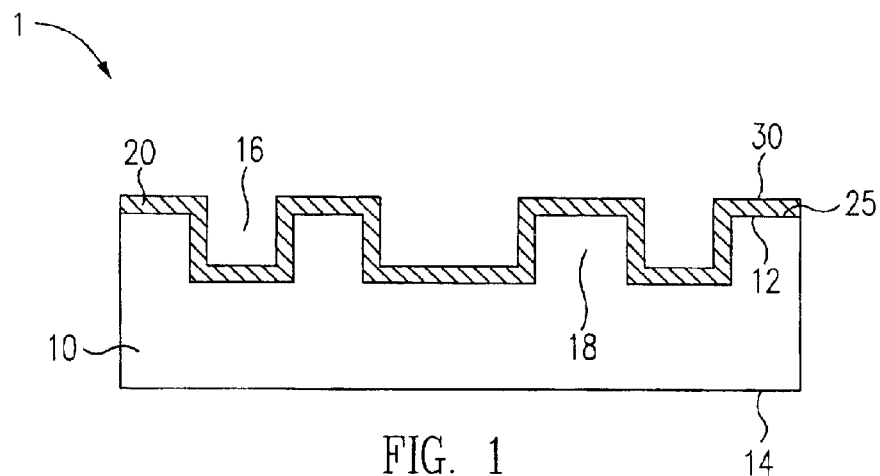
FIG. 1 depicts a cross-sectional side view of a molding die 1 with a patterned lsubstrate 10 and protective film 20.

FIG. 1 depicts a cross-sectional side view of a molding die 1 in accordance with one embodiment of the present invention. Molding die 1 includes a substrate 10 that has a patterned first surface 12 and an opposite back surface 14. A hard protective film 20 is superimposed over first surface 12. Film 20 has a contact surface 25 that is applied over first surface 12 and an opposite, exposed second surface 30.

Substrate 10 may be made of silicon, gallium arsenide, silicon nitride, or silicon carbide or any other material compatible with the very fine manufacturing techniques that are commonly used in the semiconductor industry, such as plasma etching, sputter etching, sputter deposition, and plating. For the sake of example, assume that substrate 10 is silicon unless otherwise specified.

During fabrication, molding die 1 typically will be is fabricated on a wafer, e.g., a silicon wafer, using conventional semiconductor manufacturing processes. Typically, a plurality of molding dies 1 will be made in a matrix form on a single wafer, similar to how integrated circuit chips are made on a wafer. Subsequently, the individual molding dies may be singulated from the wafer by a conventional wafer sawing method. Alternatively, the wafer may be sawn so that an array of molding dies are in a single, monolithic strip (e.g., a one by five array of molding dies).

Protective film 20 may be made of any hard and durable material that is compatible with being applied on a wafer of material of the types listed above, e.g., silicon, and is compatible with molding processes, such as are provided below. Exemplary materials include nickel, titanium, aluminum oxide, and diamond, among other possibilities.

First surface 12 of substrate 10 is topographically patterned to include one or more trenches, ridges or both, which are subsequently coated by film 20. For example, in FIG. 1, substrate 10 includes a plurality of film-coated trenches 16. Each trench 16 has vertical sidewalls and a bottom. A film-coated ridge 18 is between two trenches 16. Each ridge 18 has vertical sidewalls and a top. A trench 16 in molding die 1 may be used to mold a ridge in an optically transmissive material so as to form an optical waveguide of an IOC. Alternatively, a ridge 18 on molding die 1 may be used to mold a trench in a first material that may be filled in with a second material to form an optical waveguide of an IOC. Typically, the first material would have a higher index of refraction that the second material, as discussed below.

First surface 12 may be patterned by any fine patterning method compatible with the materials used for substrate 10. For example, where substrate 10 is silicon or gallium arsenide, techniques such as plasma etching, chemical etching, or e-beam milling may be used, typically in conjunction with a photoresist mask or other type of mask, to pattern first surface 12. Film 20 may be applied over first surface 12 by any method compatible with substrate 10 and the materials of film 20. For example, where substrate 10 is silicon and film 20 is metal, such as nickel, then sputtering, electroplating, or electrodeless plating may be used to apply film 20 over first surface 12 of substrate 10.

In an exemplary embodiment of the present invention, molding die 1 includes substrate 10 that is made of silicon and is 1–2 mm thick. First surface 12 is patterned by plasma etching to include a plurality of trenches 16. Film 20 is nickel, is 0.4–0.8 mm thick, and is applied by electrodeless plating. A metal backing plate may applied to opposing second surface 14 of substrate 10 to lend support to substrate 10.

When film 20 is applied over first surface 12 of substrate 10, lower contact surface 25 of film 20 conforms to the shape of first surface 12. However, the thickness of film 20 causes the shape of the opposing upper second surface 30 of film 20 to be slightly different from the shape of first surface 12. For example, the thickness of film 20 on opposing sidewalls of a trench in first surface 12 causes the film-coated trench 16 to be narrower than the underlying trench in first surface 12 of substrate 10. Applying film 20 over first surface 12 may also cause the shape of second surface 30 to differ from the shape etched into first surface 12 of substrate 10. Accordingly, first surface 12 of substrate 10 is patterned so that, after film 20 is applied over first surface 12, second surface 30 is a negative copy of the desired IOC, i.e., a surface that can be used to mold the IOC.

Figure 2:
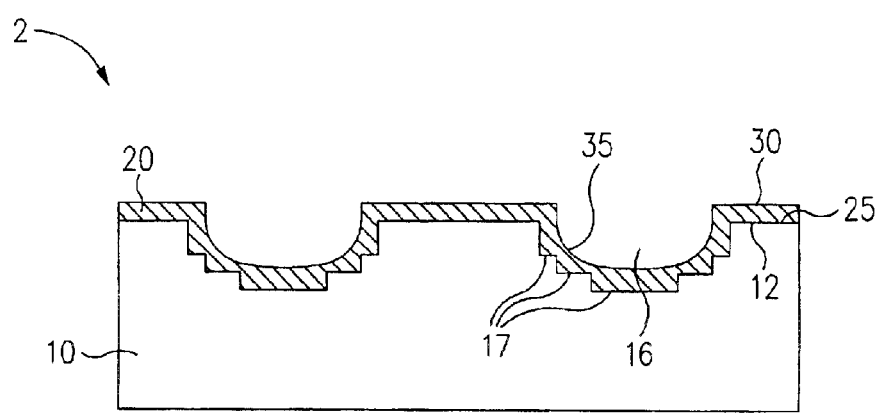
FIG. 2 depicts a cross-sectional side view of a molding die 2 with a patterned substrate 10, protective film 20, and curved molding surface 35.

FIG. 2 depicts a cross-sectional side view of an alternative embodiment of a molding die within the present invention. Molding die 2 includes a substrate 10, first surface 12, and film 20 similar to those of molding die 1 of FIG. 1. However, in molding die 2, first surface 12 of substrate 10 is patterned such that the vertical sidewalls of the trenches include intermediate steps 17 between the top and the bottom of the trench. Accordingly, second surface 30 of film 20 will have a vertically curved surface 35 within trench 16. During molding of the IOC, curved surface 35 will act to produce a molded optical waveguide with a matching curved outer surface.

Figure 3:
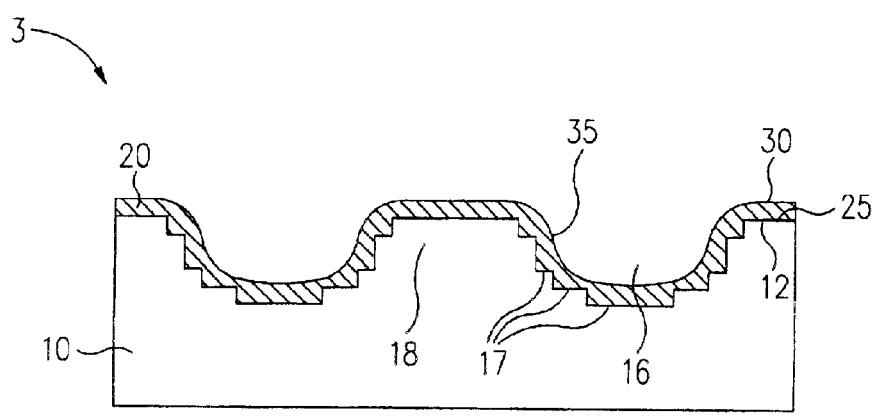
FIG. 3 depicts a cross-sectional side view of a molding die 3 with a patterned substrate 10, protective film 20, and curved molding surface 35.

FIG. 3 depicts a cross-sectional side view of a further alternative embodiment of a molding die 3 within the present invention. Molding die 3 of FIG. 3 is similar to molding die 2 of FIG. 2, except that substrate 10 is patterned with steps 17 that extend further up the sidewall of the trench toward first surface 12. Accordingly, second surface 30 forms curved surfaces 35 at both the top and the bottom of trench 16 with no sharp vertical corners. A ridge formed in a moldable material by curved surface 35 of FIG. 3 will have a matching curved surface.

The elimination of sharp vertical corners in molding dies 2 and 3 reduces the stress on the molding die during molding. Therefore, the durability of the molding die is increased and the tendency for the molding die to crack during molding is decreased over that of a similar molding die that has sharper vertical corners. The embodiment of FIG. 3 has fewer sharp corners than that of FIG. 2.

Figure 4A:
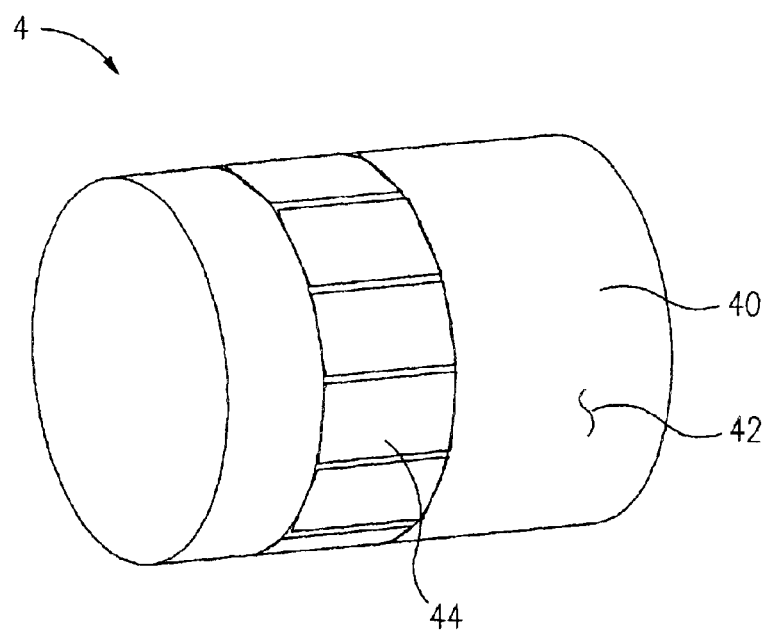
FIG. 4a depicts a molding tool 4 including a roller 40 and multiple molding dies 44 applied to an outer surface 42 of roller 40.
Figure 4B:
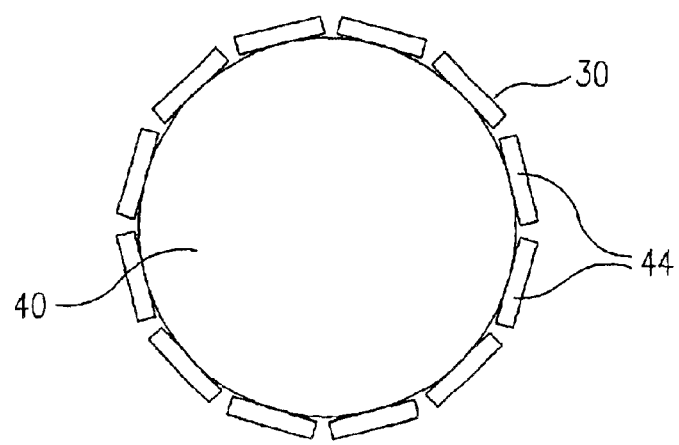

FIG. 4a depicts a molding tool 4 in accordance with another embodiment of the present invention. Molding tool 4 includes a roller 40 that is cylindrically shaped. Roller 40 may be made of any material, such as steel, that is durable and consistent with rolling and applying pressure to a moldable material. FIG. 4b depicts a cross-sectional side view of molding tool 4.

One or more molding dies 44 each having a topographically patterned surface 30 is applied to the curved outer surface 42 of roller 40. Patterned surface 32 faces outwards from roller 40. Dies 44 may be any of dies 1, 2, or 3 of FIGS. 1, 2 or 3. Alternatively, another die (e.g., a conventional die) may be used as die 44. Typically, a plurality of molding dies 44 are applied fully around outer surface 42 of roller 40, as depicted in FIG. 4a. A narrow space may be allowed between the molding dies 44. Molding dies 44 may be attached to outer surface 42 by any method compatible with the material of substrate 10, such as soldering, brazing, or bonding with an epoxy or other adhesive.

Figure 5A:
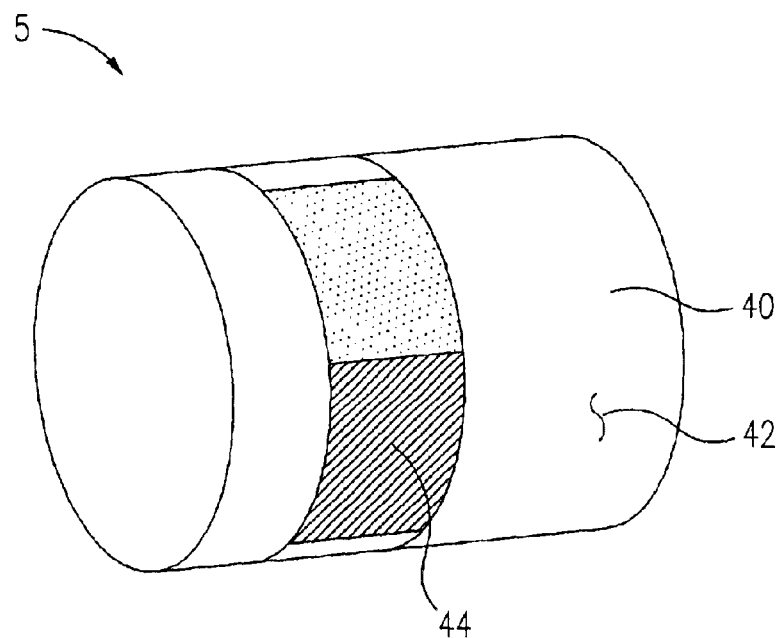
FIG. 5a depicts a molding tool 5 including a roller 40 and multiple molding dies 44 that are applied to and bent around outer surface 42 of roller 40.
Figure 5B:
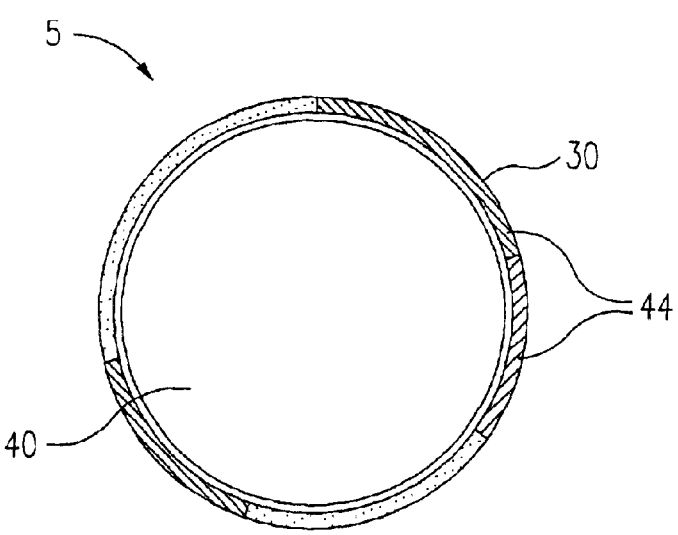

FIG. 5a depicts a further alternative embodiment of a molding tool 5 within the present invention. Roller 40 and outer surface 42 of molding tool 5 are similar to those of molding tool 4 of FIGS. 4a, 4b. However, in molding tool 5, molding dies 44 are bent around the curvature of surface 42 as they are applied to surface 42. FIG. 5b depicts a cross-sectional side view of molding tool 5. Molding dies 44 may be thinned to increase its flexibility for bending around the curvature of surface 42. With such an embodiment, excess spacing between the dies 44 may be eliminated, and the molded IOCs may have a straighter alignment.

Molding die 44 may be thinned using any method compatible with the material of the die. For example, where die 44 is one of dies 1, 2 or 3 of FIGS. 1, 2, and 3, respectively, and substrate 10 is made from a silicon wafer, then substrate 10 may be thinned using conventional polishing or etching techniques. The amount of thinning done will typically be the amount necessary to obtain the flexibility necessary to allow substrate 10 to be bent around curved outer surface 42 of roller 40.

For example, a conventional silicon wafer is 0.5 mm thick. After patterning, the unpatterned back surface 14 of the wafer may be polished to reduce the thickness of the wafer to 50 microns or less, which allows silicon substrate 10 to be flexibly bent around a roller 40 that has a radius of curvature of 10 mm. Subsequently, strips of molding dies 1, 2, or 3 may be sawed from the wafer, with each strip including a plurality of molding dies 1, 2, or 3. The strips are then applied over outer surface 42 and attached thereto, so as to form a continuous ring of molding dies 1, 2, or 3.

Figure 6A:
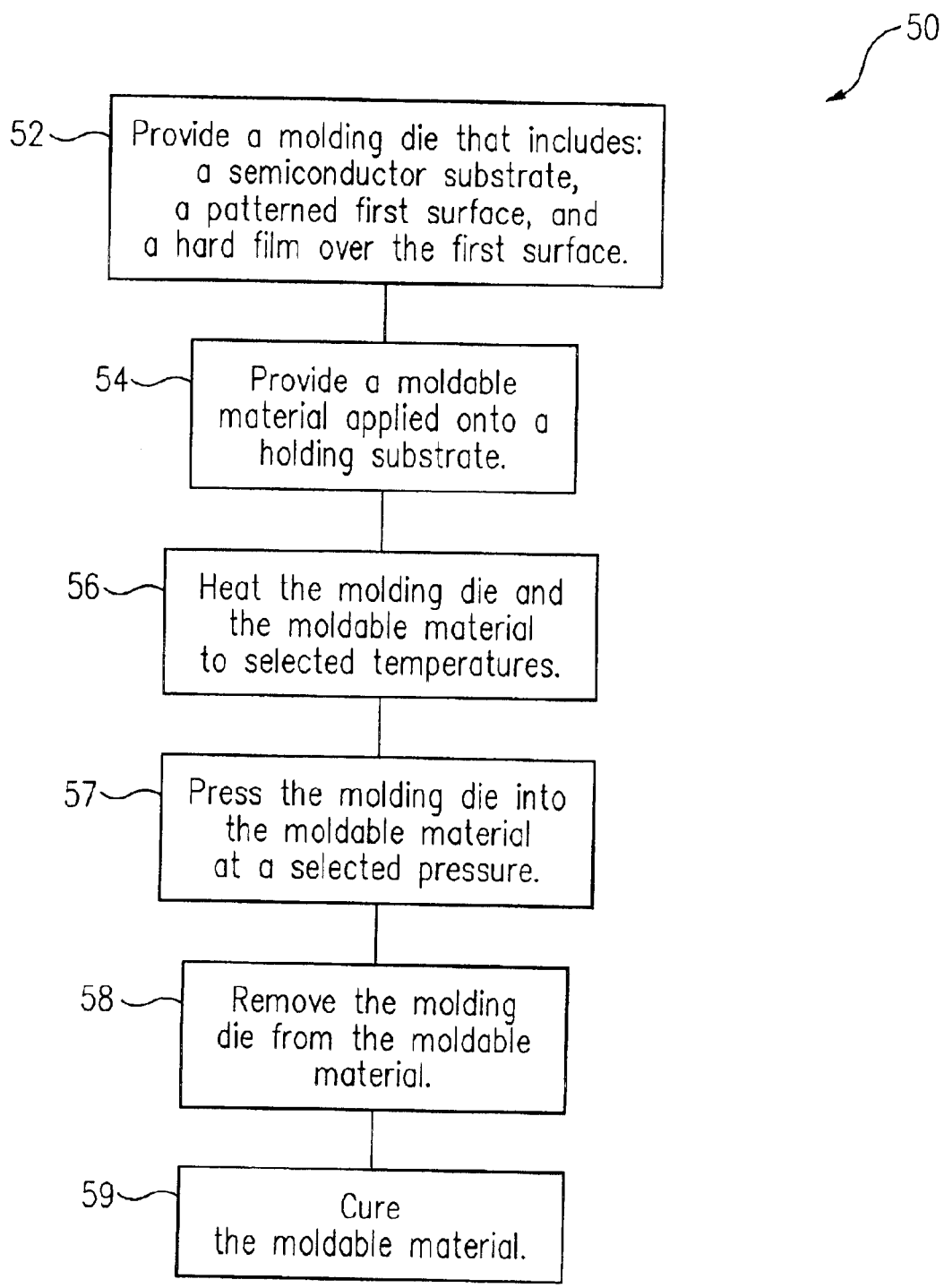
FIG. 6a is a flow chart of an exemplary method 50 of compression-molding an IOC.

FIG. 6a is a flow chart of an exemplary method 50 of compression-molding an IOC that includes at least one optical waveguide. The order of the steps may vary.

In step 52, a molding die 44 is provided, such as molding dies 1, 2, and 3 of FIGS. 1, 2, or 3 respectively. As mentioned above, each of molding dies 1, 2, and 3 includes a substrate 10, a patterned first surface 12, a film 20 over first surface 12, and an exposed second surface 30 of film 20.

Figure 6B:
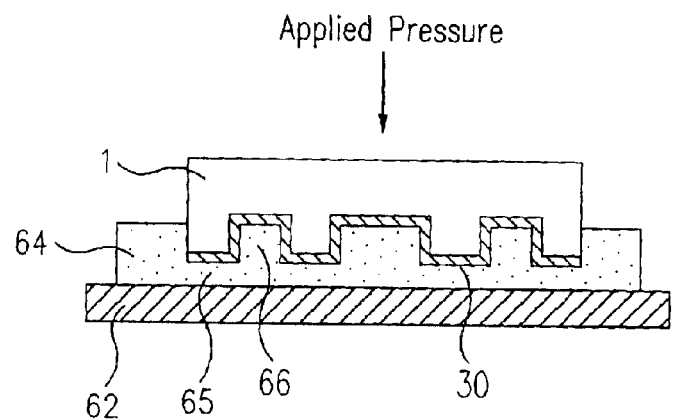

In step 54, moldable first material 64 is positioned on a top surface of a holding substrate 62, as depicted in FIG. 6b. First material 64 may be any material suitable for compression molding, such as thermosetting polymer, thermoplastic, photopolymer, or polycarbonate.

In step 56, first material 64, and molding die 1 are heated to selected temperatures. In step 57, second surface 30 of molding die 1 is pressed into first material 64 with a selected pressure. FIG. 6b depicts second surface 30 of molding die 1 being pressed into first material 64 in accordance with step 57 of FIG. 5. In one embodiment, first material 64 and molding die 1 are heated to a temperature that is near, but below, the glass transition temperature (Tg) of first material 64. Typically, the viscosity of first material 64 is high enough to require considerable pressure to force first material 64 into the contours of molding die 1.

In step 58 of FIG. 5, molding die 1 is removed from first material 64. In step 59, first material 64 is cured according to methods specific to first material 64, e.g., by exposing first material 64 to a change in temperature, exposing first material 64 to ultraviolet light, or simply waiting for the passage of a selected time period. For example, if first material 64 is a thermosetting polymer, curing may be accomplished by further increasing the temperature of first material 64 to a selected curing temperature (e.g., 150–170° C.) and waiting for a selected curing time (e.g., 5 to 60 minutes). As another example, if first material 64 is a thermoplastic, curing may be accomplished by reducing the temperature of first material 64. As a further example, if first material 64 is a photopolymer, curing may be accomplished by exposing first material 64 to ultraviolet light to the gel point and then heating as above.

According to one embodiment of the present invention, first material 64 of FIG. 6b is optically transparent and is molded to form at least one ridge-channel 66 in the IOC that is an optical waveguide. In this instance, a plurality of ridge channels 66 are formed, with each being a separate waveguide of the IOC. First material 64 also includes intervening areas 65 of the IOC where there is no ridge-channel 66 (e.g., between the ridge channels 66). In this embodiment, first material 64 is molded to be sufficiently thin in the intervening areas 65 (e.g. two microns thick) that optical signals traveling in a ridge-channel 66 are confined to the ridge-channel 66 and do not leak into intervening areas 65 or into other ridge-channels 66.

Figure 6C:
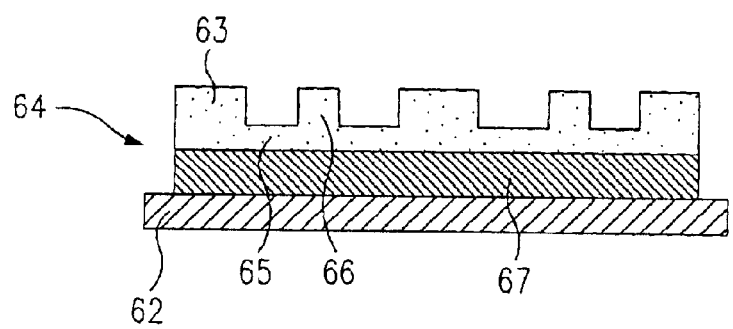

Alternatively, as is shown in FIG. 6c, first material 64 may include a plurality of layers of different materials, e.g., a topmost, exposed surface layer 63 and lower, optical confinement layer 67. Optical confinement layer 67 is beneath surface layer 63 and has an optical index of refraction that is lower than that of surface layer 63. In this embodiment, confinement layer 67 may be of any thickness as long as surface layer 63 is sufficiently thin in the intervening areas 65 (e.g. two microns thick) that an optical signal traveling in a ridge-channel 66 is confined to the ridge-channel 66.

Figure 6D:
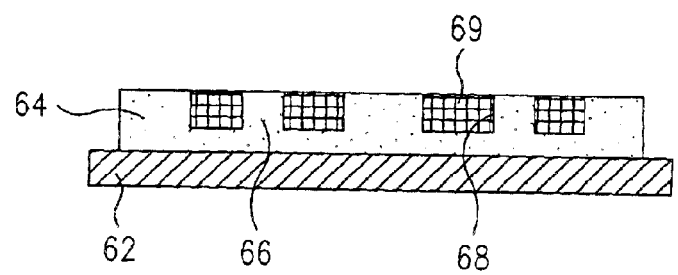

FIG. 6d depicts a cross-sectional side view of an alternative IOC produced by an alternative method within the present invention. As above, first material 64 is compression molded to form one or more channels 68. A moldable second material 69 is inserted in channels 68 so as to substantially fill channels 68. Second material 69 is cured, forming an optical waveguide. In this embodiment, second material 69 must be optically transparent and must have an optical index of refraction that is higher than that of first material 64. Neither an optical confinement layer 63 nor thin intervening areas 65 are required, as in FIGS. 6b, 6c. In FIG. 6d, the topographical pattern of second surface 30 of dies 1, 2, or 3 is not a negative copy of the IOC but rather is a positive copy of the IOC.

Figure 7:
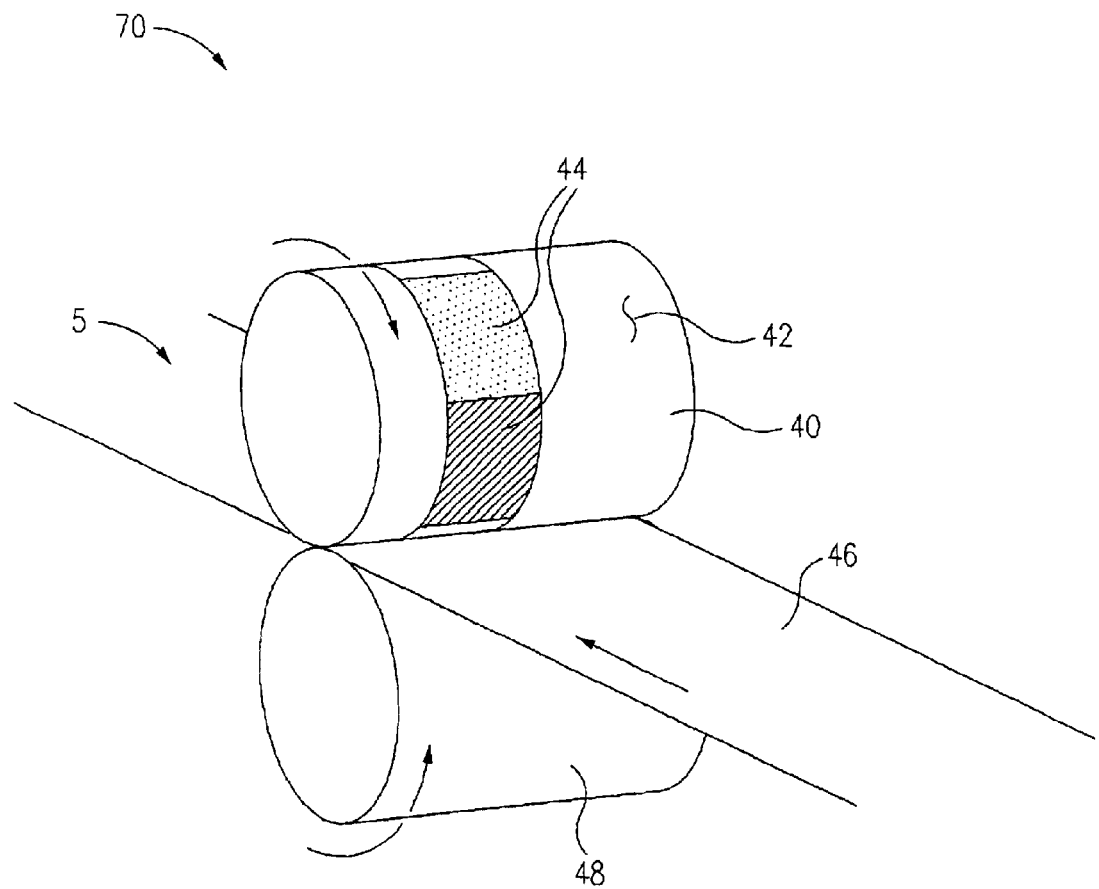
FIG. 7 depicts molding tool 5 of FIG. 5a being used in accordance with an exemplary molding method 70 of compression-molding an IOC.

FIG. 7 depicts a method 70 of using a roller to compression-mold an IOC in accordance with the present invention. Molding tool 5 of FIGS. 5a, 5b is provided and includes roller 40 and one or more molding dies 44. Molding dies 44 have a topographically patterned surface 32 and are applied to roller 40 with patterned surface 32 facing outwards from roller 40. Again, molding die 44 may be dies 1, 2, or 3 of FIGS. 1–3, respectively, or some other type of molding die.

A tape 46 of optically transparent and moldable material is provided. Subsequently, tape 46, roller 40, and a backing-roller 48 are heated, as in method 50 of FIGS. 6a, 6b. As tape 46 is conveyed past roller 40, roller 40 and backing-roller 48 cooperatively turn and apply pressure to tape 46. This pressure forces top surface 30 of the molding dies 44 of roller 40 into tape 46 to mold the IOC. Roller 40, backing-roller 48, and tape 46 may be continually operated to form a continuous tape containing multiple replications of the IOC.

Tape 46 of FIG. 7 is subsequently cured, such as by heating tape 46, cooling tape 46, exposing tape 46 to ultraviolet light, or waiting for the passage of a selected time period, as in method 50 of FIGS. 6a, 6b. For example, if tape 46 is a thermosetting polymer, curing may be accomplished by further increasing the temperature of tape 46 to a selected curing temperature (e.g., 150–170° C.) and waiting for a selected curing time (e.g., 5–60 minutes). As another example, if tape 46 is a thermoplastic, curing may be accomplished by reducing the temperature of tape 46. Tape 46 may be heated or cooled by passing tape 46 over additional rollers that are at selected temperatures, or by using heat lamps that shine on tape 46. As a further example, if tape 46 is a photopolymer, curing may be accomplished by exposing tape 46 to ultraviolet light. After curing, individual IOCs on tape 46 may be singulated through methods common to high-precision cutting of polymers or plastics, such as sawing or scribing and breaking.

In an alternative method in accordance with the present invention, each molding die 44 of tool 5 of FIG. 7 may be used to form one or more channels 68 in tape 46, similar to method 55 of FIG. 6c. (Again, die 44 may be one of dies 1, 2, or 3.) Subsequently, a moldable second material 69 is inserted so as to substantially fill each channel 68, thereby forming an optical waveguide in each channel 68. The material of tape 46 and the second material 69 may be cured in separate steps or simultaneously. In this instance, the topographical pattern of molding die 44 is not a negative copy of the IOC but rather is a positive copy of the IOC. In such an embodiment, tape 46 may or may not be optically transparent, as long as second material 69 is optically transparent and has an optical index of refraction that is higher than that of tape 46.

Figure 8:
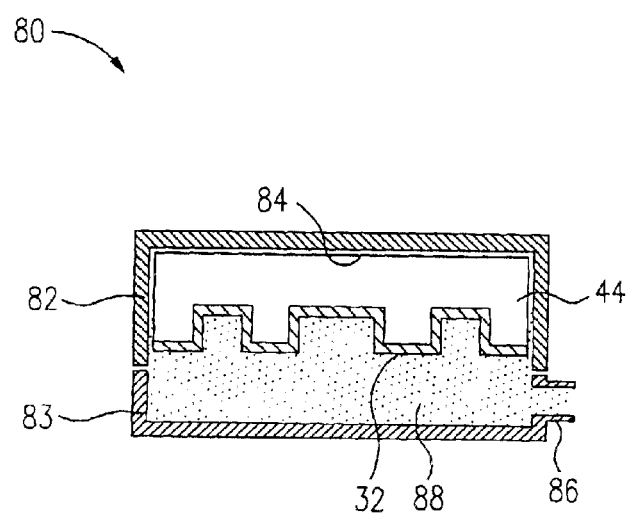
FIG. 8 is a cross-sectional side view of a molding die 44 being used according to an exemplary method 80 of injection-molding an IOC.

FIG. 8 depicts an alternative method 80 of molding an IOC in accordance with the present invention. A mold having a top half 82, a bottom half 83, an interior cavity therebetween, an interior surface 84, and an injection port 86 is provided. A molding die 44 (e.g., molding die 1, 2, or 3 of FIGS. 1, 2, and 3) with a topographically patterned surface 32 is provided. Molding die 44 is fixed to interior surface 84 of top half 82, with patterned surface 32 facing toward the interior of the mold cavity. Molding die 44 is placed so that injection port 86 has clear access to the interior cavity. An optically transparent and moldable first material 88 is provided into the interior of cavity 82 through injection port 86 so that first material 88 contacts and conforms to the pattern of surface 32. An injection molding technique will typically be used. Transfer molding may also be used. First material 88 is subsequently cured by methods common to injection molding or transfer molding. The mold is then opened and first material 88 is removed.

As an example of an alternative method in accordance with the present invention, injection-molding may be used as in method 80 of FIG. 8 to form at least one channel 68 in first material 88, similar to that done in method 55 of FIG. 6c. Subsequently, a moldable second material 69 is inserted so as to substantially fill each channel 68 and thereby forming optical waveguides. In this embodiment, the topographical pattern of molding die 44 is not a negative copy of the IOC but rather is a positive copy of the IOC. Tape 46 may or may not be optically transparent, as long as second material 69 is optically transparent and has an optical index of refraction that is higher than that of first material 88. First material 88 and second material 69 may be cured separately or simultaneously.

The embodiments described above are merely examples of the present invention. Practitioners will recognize that variations of the embodiments herein are possible within the equitable scope of the appended claims.

What is claimed is:

1. A molding die for molding an integrated optical circuit (IOC), said IOC including at least one optical waveguide, the molding die comprising:

a substrate having a topographically patterned first surface, wherein said first surface includes at least one wall having a top and a bottom, and at least one intermediate step in the wall between the top and bottom; and a conformal protective film provided over said first surface including over said wall and said at least one step, said film having a outer second surface, wherein said second surface forms a negative copy of the IOC to be molded using the molding die, and said outer second surface is curved between the top and bottom of the wall of the substrate and over the at least one intermediate step.

2. The molding die of claim 1, wherein said protective film is selected from the group of metal, aluminum oxide, and diamond, and said substrate is made of material selected from the group of silicon, silicon-nitride, silicon carbide, and gallium arsenide.

3. The molding die of claim 1, wherein said substrate is made of material selected from the group of silicon, silicon-nitride, silicon carbide, and gallium arsenide.

4. A method for making a substrate for molding an IOC, said IOC including at least one optical waveguide, the method comprising:

providing a substrate, said substrate having a first surface;

patterning said first surface so that said first surface has a topographical pattern, wherein said patterned first surface includes at least one wall having a top and a bottom, and said first surface includes at least one intermediate step in the at least one wall between said top and said bottom; and providing a conformal protective film over the topographical pattern of the first surface including over said at least one wall and said at least one intermediate step, said film having an outer second surface, wherein said second surface forms a negative copy of the IOC to be molded using the molding die and said outer second surface is curved between the top and bottom of the at least one wall of the substrate and over the at least one intermediate step.

5. The method of claim 4, wherein said protective film is metal and is provided by plating the metal onto said first surface.

6. A method for compression-molding an IOC, said IOC including at least one optical waveguide, the method comprising:

providing a molding die comprising at least one substrate having a topographically patterned first surface, wherein said patterned first surface includes at least one wall having a top and a bottom, and said first surface includes at least one intermediate step in the at least one wall between said top and said bottom, and a conformal protective film provided over said first surface including over said at least one wall and said at least one intermediate step, said film having an outer second surface, wherein said second surface forms a negative copy of the IOC and said outer second surface is curved between the top and bottom of the at least one wall of the substrate and over the at least one intermediate step;

providing a holding substrate with a surface;

providing a moldable first material on said holding substrate;

heating one or both of said molding die and said first material;

pressing said patterned second surface into said first material at a selected pressure, thereby molding a patterned IOC surface; and curing the first material.

7. The method of claim 6, wherein said protective film is made of material selected from the group of metal, aluminum oxide, and diamond.

8. The method of claim 7, wherein said substrate is made of material selected from the group of silicon, silicon-nitride, silicon-carbide and gallium arsenide.

9. The method of claim 6, wherein said first material is optically transmitting.

10. The method of claim 6, wherein said IOC surface includes at least one channel, and the method further comprises:

providing a moldable second material, said second material being optically transmitting and having an optical index of refraction that is higher than that of said first material;

filling at least one channel in said IOC surface with the second material; and curing the second material.

11. The method of claim 6, wherein said first material comprises a plurality of layers, said layers including an optically transmissive surface layer for transmitting optical signals that is pressed and an optical confinement layer located beneath said surface layer, said confinement layer having an index of refraction that is less than that of said surface layer.

12. A method for molding an IOC, said IOC including at least one optical waveguide, the method comprising:

providing a mold having a cavity defined by an interior surface;

providing at least one substrate having a topographically patterned first surface, wherein said patterned first surface includes at least one wall having a top and a bottom, and said first surface includes at least one intermediate step in the at least one wall between said top and said bottom, and a conformal protective film provided over said first surface including over said at least one wall and said at least one intermediate step, said film having an outer second surface, wherein said second surface forms a negative copy of the IOC, and maid outer second surface is curved between the top and bottom of the wall of the substrate and over the at least one intermediate step, said substrate being applied onto said interior surface with said second surface facing towards the cavity;

injecting a moldable first material into the cavity so that said first material contacts and conforms to said second surface, thereby molding a patterned IOC surface;

curing the first material; and removing the first material from said cavity.

13. The method of claim 12, wherein said first material is optically transmitting.

14. The method of claim 12, wherein said IOC surface includes at least one channel, and the method further comprises:

providing a moldable second material, said second material being optically transmitting and having an optical index of refraction that is higher than that of said first material;

filling at least one channel in said IOC surface with the second material; and curing the second material.

15. The method of claim 12, wherein said protective film is made of material selected from the group of metal, aluminum oxide, and diamond, and said substrate is selected from the group of silicon or gallium arsenide.

* * * * *